(12) United States Patent
Liu

(10) Patent No.: US 11,036,080 B2
(45) Date of Patent: Jun. 15, 2021

(54) LIGHT EMITTING DIODE BACKLIGHT SYSTEM AND LIGHT EMITTING DIODE CONTROL CIRCUIT

(71) Applicant: Power Forest Technology Corporation, Hsinchu County (TW)

(72) Inventor: Chia-Hsien Liu, Chiayi County (TW)

(73) Assignee: Power Forest Technology Corporation, Hsinchu County (TW)

( * ) Notice: Subject to any disclaimer, the term of this patent is extended or adjusted under 35 U.S.C. 154(b) by 0 days.

(21) Appl. No.: 16/558,345

(22) Filed: Sep. 3, 2019

(65) Prior Publication Data
US 2021/0003887 A1    Jan. 7, 2021

(30) Foreign Application Priority Data

Jul. 4, 2019  (TW) .................... 108123631

(51) Int. Cl.
*G02F 1/1335*    (2006.01)
*G09G 3/34*    (2006.01)
(Continued)

(52) U.S. Cl.
CPC ..... *G02F 1/133603* (2013.01); *G09G 3/3406* (2013.01); *H05B 45/48* (2020.01); *G09G 2320/0626* (2013.01)

(58) Field of Classification Search
CPC ... G02F 1/133603; H05B 45/48; H05B 47/23; H05B 45/58; G09G 3/3406;
(Continued)

(56) References Cited

U.S. PATENT DOCUMENTS 7,606,679 B1 * 10/2009 Voicu .................... H05B 45/58
                                                     702/183
8,081,199 B2   12/2011 Takata et al.
(Continued)

FOREIGN PATENT DOCUMENTS

CN     102136252      7/2011
CN     108877656     11/2018
(Continued)

OTHER PUBLICATIONS

Office Action of Taiwan Counterpart Application, dated Mar. 26, 2020, p. 1-p. 6.
(Continued)

*Primary Examiner* — Vinh T Lam
(74) *Attorney, Agent, or Firm* — JCIPRNET

(57) ABSTRACT

An LED backlight system and an LED control circuit are provided. The LED backlight system includes an LED string and the LED control circuit. The LED control circuit includes an LED driver, a switching circuit and an abnormality detecting circuit. The LED driver is configured to generate a control signal. The switching circuit controls a current flowing through the LED string in response to the control signal. The abnormality detecting circuit is configured to detect a voltage or the current of a first end of the LED string. When the voltage or the current of the first end of the LED string is less than or equal to a threshold value, the abnormality detecting circuit turns off the switching circuit, and the abnormality detecting circuit detects an impedance of the first end of the LED string to determine an abnormal state of the LED string.

10 Claims, 4 Drawing Sheets

(51) Int. Cl.
*H05B 33/08* (2020.01)
*G02F 1/13357* (2006.01)
*H05B 45/48* (2020.01)

(58) Field of Classification Search
CPC ........ G09G 2320/0626; G03B 21/2086; G03B 21/206; Y02B 20/40
See application file for complete search history.

(56) References Cited

U.S. PATENT DOCUMENTS

| | | |
|---|---|---|
| 8,963,810 B2 | 2/2015 | Li et al. |
| 10,285,225 B2 | 5/2019 | Shan |
| 2010/0328370 A1* | 12/2010 | Takata ................... H05B 45/38 345/694 |
| 2011/0316425 A1* | 12/2011 | Chang ................... H05B 45/48 315/122 |
| 2014/0168567 A1* | 6/2014 | Kikuchi ............... H05B 45/347 349/61 |
| 2014/0247432 A1* | 9/2014 | Yanase ............... G03B 21/2086 353/85 |
| 2015/0116635 A1* | 4/2015 | Kanemitsu ............. H05B 45/46 349/69 |
| 2020/0178371 A1* | 6/2020 | Malyna .................. H05B 45/44 |

FOREIGN PATENT DOCUMENTS

| | | |
|---|---|---|
| TW | 200822013 | 5/2008 |
| TW | 200915261 | 4/2009 |
| TW | 201127193 | 8/2011 |

OTHER PUBLICATIONS

"Office Action of Taiwan Counterpart Application", dated Jan. 18, 2021, pp. 1-13.

* cited by examiner

LIGHT EMITTING DIODE BACKLIGHT SYSTEM AND LIGHT EMITTING DIODE CONTROL CIRCUIT

CROSS-REFERENCE TO RELATED APPLICATION

This application claims the priority benefit of Taiwan application serial no. 108123631, filed on Jul. 4, 2019. The entirety of the above-mentioned patent application is hereby incorporated by reference herein and made a part of this specification.

BACKGROUND OF THE INVENTION

1. Field of the Invention

The present invention relates to a light emitting diode (LED) driving technology, and particularly relates to an LED backlight system and an LED control circuit.

2. Description of Related Art

In general, an LED backlight module is provided with a plurality of LED strings arranged side by side, and each of LED strings can be composed of a plurality of LEDs connected in series. Basically, all of the LED strings can be operated at the system voltage (VBUS) generated by a boost unit so as to keep the current flowing through each LED string at the same constant current.

In some cases, the LED strings may have abnormal conditions, for example, the LED strings may be open-circuited or the LED strings may be short-circuited to a ground terminal due to abnormal insulation. When the LED strings have the above abnormal conditions, an LED control circuit must immediately detect and determine the type of the abnormal condition, so that a protection circuit can perform corresponding protection mechanism.

In detail, when the LED strings are open-circuited, the load of the boost unit becomes light. In contrast, when the LED strings are short-circuited to the ground terminal, the load of the boost unit becomes heavy. Therefore, a common practice is to distinguish the above two abnormal conditions according to the load change of the boost unit. Furthermore, when the above abnormal conditions occur, the LED control circuit can generate a pulse width modulation signal to adjust the on time of a switch in the boost unit, thereby raising the system voltage. The LED control circuit can detect the system voltage and can detect the current flowing through the switch by a sensing resistor coupled to the switch. If the system voltage exceeds a threshold voltage value, indicating that the load of the boost unit becomes light, thereby determining that the LED strings are open-circuited. In contrast, if the system voltage does not exceed the threshold voltage value and the current flowing through the switch is greater than a reference value, indicating that the load of the boost unit becomes heavy, thereby determining that the LED strings are short-circuited to the ground terminal.

However, the raise of the system voltage causes the cross-voltage between two ends of the LED strings to become larger, which may accidentally trigger other protection mechanisms (such as the protection mechanism for short-circuiting of adjacent LED components), so that it is difficult to correctly determine that the LED strings are open-circuited. Furthermore, the above method cannot be applied to a directly powered LED backlight module in which a boost unit is not arranged. In addition, too small resistance value of the sensing resistor may also cause a failure to correctly determine that the LED strings are short-circuited to the ground terminal. Moreover, under the application situation that the current of the LED strings is set to be a low current, the LED strings are lightly loaded for the boost unit, so that it is difficult to distinguish the abnormal conditions according to whether the load of the boost unit becomes light or not.

SUMMARY OF THE INVENTION

Based on the above, the present invention provides an LED backlight system and an LED control circuit for solving the problems mentioned in the section of Description of Related Art.

The LED control circuit of the present invention is configured to control the brightness of M LED strings, wherein M is a positive integer. The LED control circuit includes an LED driver, N switching circuits, and N abnormality detecting circuits. The LED driver is configured to generate N control signals, wherein N is a positive integer. Each of the N switching circuits is coupled to a first end of at least one of the M LED strings. Each of the N switching circuits is coupled to the LED driver to receive one of the N control signals and to control a current flowing through the at least one corresponding LED string in response to the corresponding control signal. Each of the N abnormality detecting circuits is coupled to one corresponding switching circuit among the N switching circuits and the first end of at least one corresponding LED string among the M LED strings. Each of the N abnormality detecting circuits is configured to detect a voltage or a current of the first end of the at least one corresponding LED string. When the voltage or the current of the first end of the at least one corresponding LED string is less than or equal to a threshold value, the abnormality detecting circuit turns off the corresponding switching circuit, and the abnormality detecting circuit detects an impedance of the first end of the at least one corresponding LED string to determine an abnormal state of the at least one corresponding LED string.

In an embodiment of the present invention, if the impedance of the first end of the at least one corresponding LED string is high impedance, the abnormality detecting circuit determines that the at least one corresponding LED string is open-circuited.

In an embodiment of the present invention, if the impedance of the first end of the at least one corresponding LED string is low impedance, the abnormality detecting circuit determines that the at least one corresponding LED string is short-circuited to a ground terminal.

In an embodiment of the present invention, the abnormality detecting circuit includes a current detecting circuit and an impedance detecting circuit. The current detecting circuit is coupled to the first end of the at least one corresponding LED string and the corresponding switching circuit, and is configured to detect the current of the first end of the at least one corresponding LED string to obtain a detection current value. When the detection current value is equal to zero, the current detecting circuit turns off the corresponding switching circuit and generates an indication signal. The impedance detecting circuit is coupled to the current detecting circuit to receive the indication signal, and detects the impedance of the first end of the at least one corresponding LED string in response to the indication signal to obtain a detection impedance value. If the detection impedance value is greater than a first reference value, the impedance detecting circuit determines that the at least one corresponding LED string is open-circuited. If the detection impedance value is less than a second reference value, the impedance detecting circuit determines that the at least one corresponding LED string is short-circuited to the ground terminal, wherein the first reference value is greater than the second reference value.

In an embodiment of the present invention, the abnormality detecting circuit includes a voltage detecting circuit and an impedance detecting circuit. The voltage detecting circuit is coupled to the first end of the at least one corresponding LED string and the corresponding switching circuit, and is configured to detect the voltage of the first end of the at least one corresponding LED string to obtain a detection voltage value. When the detection voltage value is equal to zero, the voltage detecting circuit turns off the corresponding switching circuit and generates an indication signal. The impedance detecting circuit is coupled to the voltage detecting circuit to receive the indication signal, and detects the impedance of the first end of the at least one corresponding LED string in response to the indication signal to obtain a detection impedance value. If the detection impedance value is greater than the first reference value, the impedance detecting circuit determines that the at least one corresponding LED string is open-circuited. If the detection impedance value is less than the second reference value, the impedance detecting circuit determines that the at least one corresponding LED string is short-circuited to the ground terminal, wherein the first reference value is greater than the second reference value.

The LED backlight system of the present invention includes M LED strings and an LED control circuit, wherein M is a positive integer. The LED control circuit is coupled to the M LED strings. The LED control circuit includes an LED driver, N switching circuits, and N abnormality detecting circuits, wherein N is a positive integer. The LED driver is configured to generate N control signals. Each of the N switching circuits is coupled to a first end of at least one of the M LED strings. Each of the N switching circuits is coupled to the LED driver to receive one of the N control signals and to control a current flowing through at least one corresponding LED string in response to the corresponding control signal. Each of the N abnormality detecting circuits is coupled to one corresponding switching circuit among the N switching circuits and the first end of at least one corresponding LED string among the M LED strings. Each of the N abnormality detecting circuits is configured to detect a voltage or a current of the first end of the at least one corresponding LED string. When the voltage or the current of the first end of the at least one corresponding LED string is less than or equal to a threshold value, the abnormality detecting circuit turns off the corresponding switching circuit, and the abnormality detecting circuit detects the impedance of the first end of the at least one corresponding LED string to determine an abnormal state of the at least one corresponding LED string.

Based on the above, when detecting that the LED string has an abnormality, the LED backlight system and the LED control circuit provided by the embodiments of the present invention can turn off the switching circuit and detect the impedance of the first end of the LED string as well as determine the abnormality type of the LED string according to the detected impedance. The LED backlight system and the LED control circuit according to the embodiments of the present invention do not determine the abnormality type of the LED string according to the load change of the system voltage in the LED backlight system, so that the problems mentioned in the section of Description of Related Art can be solved.

In order to make the above features and advantages of the present invention more obvious and comprehensible, embodiments accompanied with drawings are described in detail below.

DESCRIPTION OF THE EMBODIMENTS

Figure 1:
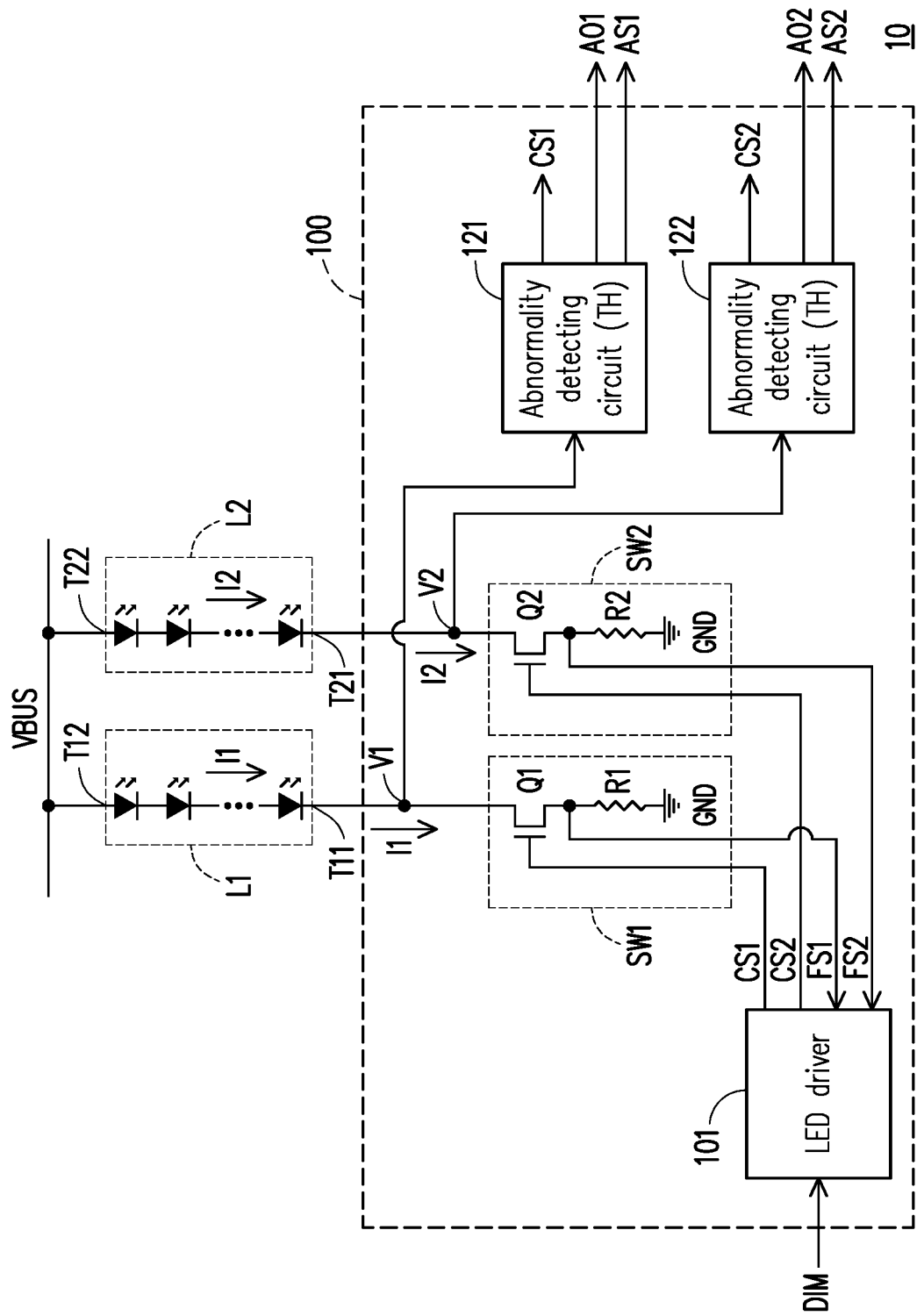
FIG. 1 is a schematic diagram of a directly powered LED backlight system according to an embodiment of the present invention.

Reference will now be made in detail to the exemplary embodiments of the present invention, and examples of the exemplary embodiments are illustrated in the accompanying drawings. Wherever possible, the same reference numbers are used in the drawings and the description to refer to the same or like parts.

FIG. 1 is a schematic diagram of a directly powered LED backlight system according to an embodiment of the present invention. Referring to FIG. 1, an LED backlight system 10 can include M LED strings and an LED control circuit 100. In the present exemplary embodiment, M is a positive integer. However, for the convenience of explanation and content conciseness, an exemplary embodiment in which M is equal to 2 will be described below, and embodiments in which M is other positive integers (such as 1, 3, 4, 5, etc.) may be derived from the following description. Therefore, as shown in FIG. 1, the LED backlight system 10 includes two LED strings L1 and L2, and each of the LED strings L1 and L2 includes a plurality of LEDs connected in series.

The first end T11 (cathode end) of the LED string L1 is coupled to the LED control circuit 100, and the second end T12 (anode end) of the LED string L1 is coupled to a system voltage VBUS. Similarly, the first end T21 (cathode end) of the LED string L2 is coupled to the LED control circuit 100, and the second end T22 (anode end) of the LED string L2 is coupled to the system voltage VBUS. The system voltage VBUS required for the operation of the LED strings L1 and L2 is directly supplied by an external power supply device, so that the LED backlight system 10 may not include a boost-buck circuit.

The LED control circuit 100 is configured to dim the LED strings L1 and L2 according to a dimming signal DIM. In detail, the LED control circuit 100 may include an LED driver 101, N switching circuits, and N abnormality detecting circuits. In the present exemplary embodiment, N is a positive integer, and N may be greater than or equal to or less than M. However, for the convenience of explanation and content conciseness, an exemplary embodiment in which N is equal to 2 will be described below, and embodiments in which N is other positive integers (such as 1, 3, 4, 5, etc.) may be derived from the following description. Therefore, as shown in FIG. 1, the LED control circuit 100 includes two switching circuits SW1 and SW2 and two abnormality detecting circuits 121 and 122. The LED driver 101 is configured to generate two control signals CS1 and CS2 according to the dimming signal DIM. In an embodiment of the present invention, the LED driver 101 can be implemented by using an existing LED driving circuit.

The switching circuit SW1 is coupled to the first end T11 of the LED string L1. The switching circuit SW1 is coupled to the LED driver 101 to receive the control signal CS1. The switching circuit SW1 can control the current I1 flowing through the LED string L1 in response to the control signal CS1. Similarly, the switching circuit SW2 is coupled to the first end T21 of the LED string L2. The switching circuit SW2 is coupled to the LED driver 101 to receive the control signal CS2. The switching circuit SW2 can control the current I2 flowing through the LED string L2 in response to the control signal CS2.

In an embodiment of the present invention, the switching circuit SW1 (SW2) may include a power switch Q1 (Q2) and a sensing resistor R1 (R2), but is not limited thereto. The first end of the power switch Q1 (Q2) is coupled to the first end T11 (T21) of the LED string L1 (L2). The control end of the power switch Q1 (Q2) receives the control signal CS1 (CS2). The sensing resistor R1 (R2) is coupled between the second end of the power switch Q1 (Q2) and a ground terminal GND, and is configured to sense the current flowing through the power switch Q1 (Q2) to generate a feedback signal FS1 (FS2), so that the LED driver 101 can adjust the control signal CS1 (CS2) according to the feedback signal FS1 (FS2). In other embodiments of the present invention, the switching circuit SW1 (SW2) may also omit the arrangement of the sensing resistor R1 (R2) according to the practical application or design requirements.

The abnormality detecting circuit 121 is coupled to the switching circuit SW1 and the first end T11 of the LED string L1, and is configured to detect the voltage V1 or the current I1 of the first end T11 of the LED string L1. Similarly, the abnormality detecting circuit 122 is coupled to the switching circuit SW2 and the first end T21 of the LED string L2, and is configured to detect the voltage V2 or the current I2 of the first end T21 of the LED string L2.

In particular, when the voltage V1 or the current I1 of the first end T11 of the LED string L1 is less than or equal to a threshold value TH, indicating that the LED string L1 is abnormal, so that the abnormality detecting circuit 121 can turn off the switching circuit SW1, and the abnormality detecting circuit 121 detects the impedance of the first end T11 of the LED string L1 when the switching circuit SW1 is off to determine an abnormal state of the LED string L1, wherein the abnormal state of the LED string L1 may be that the LED string L1 is open-circuited or the LED string L1 is short-circuited to the ground terminal GND.

In an embodiment of the present invention, when the voltage V1 or the current I1 of the first end T11 of the LED string L1 is less than or equal to the threshold value TH, the abnormality detecting circuit 121 can directly generate the control signal CS1 to turn off the switching circuit SW1 or can turn off the switching circuit SW1 through the LED driver 101.

In an embodiment of the present invention, the LED string L1 is open-circuited may be that, for example, the first end T11 of the LED string L1 is disconnected from the LED control circuit 100, or the second end T12 of the LED string L1 is disconnected from the system voltage VBUS, or adjacent LEDs in the LED string L1 are disconnected. In an embodiment of the present invention, the LED string L1 is short-circuited to the ground terminal GND may be that, for example, the first end T11 of the LED string L1 is short-circuited to the ground terminal GND.

Similarly, when the voltage V2 or the current I2 of the first end T21 of the LED string L2 is less than or equal to the threshold value TH, indicating that the LED string L2 is abnormal, so that the abnormality detecting circuit 122 can turn off the switching circuit SW2, and the abnormality detecting circuit 122 detects the impedance of the first end T21 of the LED string L2 when the switching circuit SW2 is off to determine an abnormal state of the LED string L2, wherein the abnormal state of the LED string L2 may be that the LED string L2 is open-circuited or the LED string L2 is short-circuited to the ground terminal GND.

In an embodiment of the present invention, when the voltage V2 or the current I2 of the first end T21 of the LED string L2 is less than or equal to the threshold value TH, the abnormality detecting circuit 122 can directly generate the control signal CS2 to turn off the switching circuit SW2 or can turn off the switching circuit SW2 through the LED driver 101.

In an embodiment of the present invention, the LED string L2 is open-circuited may be that, for example, the first end T21 of the LED string L2 is disconnected from the LED control circuit 100, or the second end T22 of the LED string L2 is disconnected from the system voltage VBUS, or adjacent LEDs in the LED string L2 are disconnected. In an embodiment of the present invention, the LED string L2 is short-circuited to the ground terminal GND may be that, for example, the first end T21 of the LED string L2 is short-circuited to the ground terminal GND.

It can be understood that in the embodiment of the present invention, when an abnormality of the LED string L1 (L2) is detected, the switching circuit SW1 (SW2) is turned off, the impedance of the first end T11 (T21) of the LED string L1 (L2) is detected, and the abnormality type of the LED string L1 (L2) is determined according to the detected impedance. In other words, the embodiment of the present invention does not determine the abnormality type of the LED string L1 (L2) according to the load change of the system voltage VBUS, and then, the system voltage VBUS does not need to be raised during the detection of the abnormality. Therefore, the LED control circuit 100 is particularly suitable for use in a directly powered LED backlight system without a boost-buck circuit.

In an embodiment of the present invention, if the detected impedance of the first end T11 of the LED string L1 is high impedance, the abnormality detecting circuit 121 can determine that the LED string L1 is open-circuited, and accordingly generates an open circuit protection signal AO1, so that the LED backlight system 10 can perform a subsequent open circuit protection operation. Similarly, if the detected impedance of the first end T21 of the LED string L2 is high impedance, the abnormality detecting circuit 122 can determine that the LED string L2 is open-circuited, and accordingly generates an open circuit protection signal AO2, so that the LED backlight system 10 can perform a subsequent open circuit protection operation. The details of the open circuit protection operation performed by the LED backlight system 10 are familiar to those skilled in the art and are not the focus of the present invention, therefore will not be described herein.

In an embodiment of the present invention, if the detected impedance of the first end T11 of the LED string L1 is low impedance, the abnormality detecting circuit 121 can determine that the LED string L1 is short-circuited to the ground terminal GND, and accordingly generates a short circuit protection signal AS1, so that the LED backlight system 10 can perform a subsequent short circuit protection operation. Similarly, if the detected impedance of the first end T21 of the LED string L2 is low impedance, the abnormality detecting circuit 122 can determine that the LED string L2 is short-circuited to the ground terminal GND, and accordingly generates a short circuit protection signal AS2, so that the LED backlight system 10 can perform a subsequent short circuit protection operation. The details of the short circuit protection operation performed by the LED backlight system 10 are familiar to those skilled in the art and are not the focus of the present invention, therefore will not be described herein.

In an embodiment of the present invention, after the abnormality detecting circuit 121 (122) sends the open circuit protection signal AO1 (AO2) or the short circuit protection signal AS1 (AS2), if the abnormality detecting circuit 121 (122) detects that the voltage V1 (V2) or current I1 (I2) of the first end T11 (T21) of the LED string L1 (L2) is greater than the threshold value TH, indicating that the LED string L1 (L2) has returned to normal, therefore, the abnormality detecting circuit 121 (122) stops controlling the switching circuit SW1 (SW2), and the LED driver 101 controls the switching circuit SW1 (SW2), so that the LED string L1 (L2) returns to normal operation.

It should be noted that the LED control circuit 100 of the present embodiment can also be applied to other types of LED systems, and is not only applied to the LED backlight system.

Details of implementation of the abnormality detecting circuits 121 and 122 will be described below. Since the implementation of the abnormality detecting circuits 121 and 122 are similar, the abnormality detecting circuit 121 will be described below as an exemplary embodiment, and the implementation of the abnormality detecting circuit 122 can be analogized according to the following description.

Figures 2A, 2B:
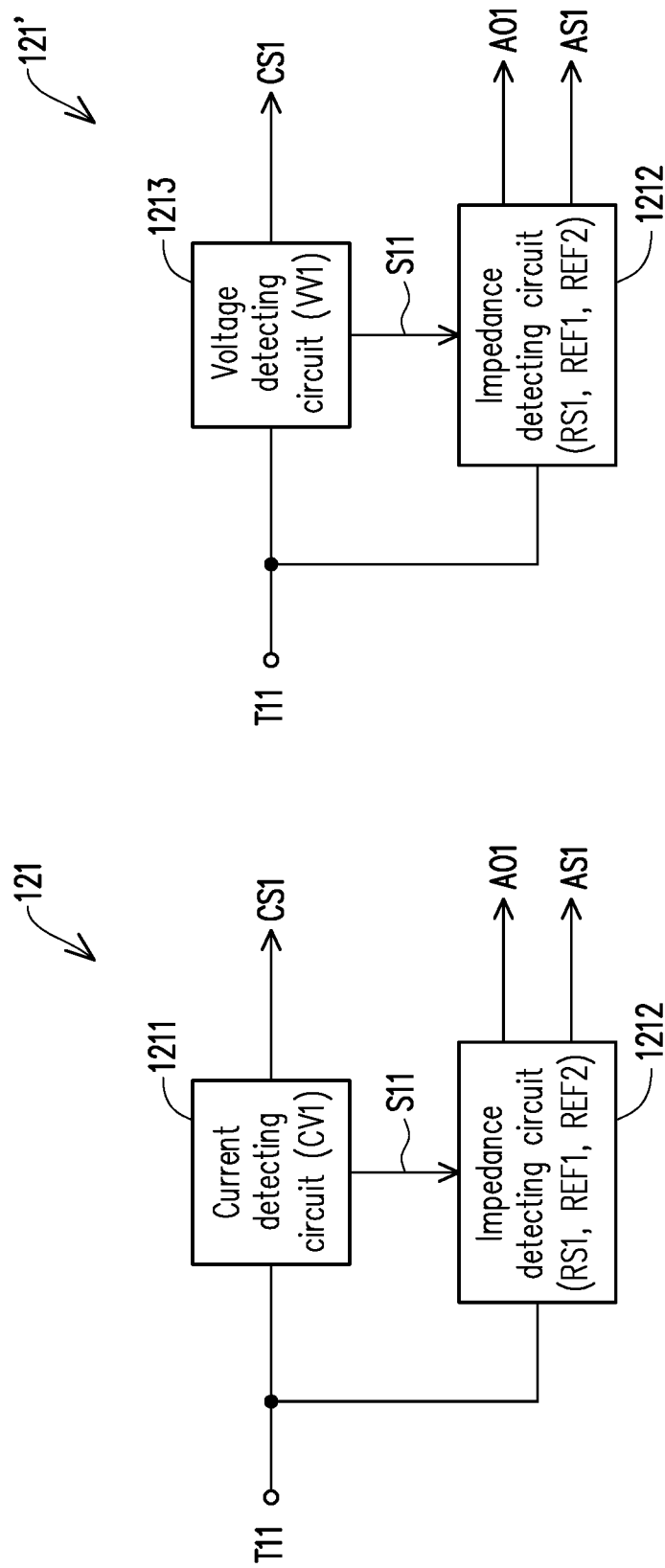
FIG. 2A is a block diagram of an abnormality detecting circuit in FIG. 1 according to an embodiment of the present invention.
FIG. 2B is a block diagram of an abnormality detecting circuit in FIG. 1 according to another embodiment of the present invention.

FIG. 2A is a block diagram of an abnormality detecting circuit 121 in FIG. 1 according to an embodiment of the present invention. Referring to FIG. 1 and FIG. 2A, the abnormality detecting circuit 121 can include a current detecting circuit 1211 and an impedance detecting circuit 1212. The current detecting circuit 1211 is coupled to the first end T11 of the LED string L1 and the switching circuit SW1, and is configured to detect the current I1 of the first end T11 of the LED string L1 to obtain a detection current value CV1. When the detection current value CV1 is equal to zero, the current detecting circuit 1211 can generate the control signal CS1 to turn off the switching circuit SW1 and generate an indication signal S11.

The impedance detecting circuit 1212 is coupled to the current detecting circuit 1211 to receive the indication signal S11, and detects the impedance of the first end T11 of the LED string L1 in response to the indication signal S11 to obtain a detection impedance value RS1. If the detection impedance value RS1 is greater than a first reference value REF1, indicating that the impedance of the first end T11 of the LED string L1 is high impedance, so that the impedance detecting circuit 1212 determines that the LED string L1 is open-circuited. In contrast, if the detection impedance value RS1 is smaller than a second reference value REF2, indicating that the impedance of the first end T11 of the LED string L1 is low impedance, so that the impedance detecting circuit 1212 determines that the LED string L1 is short-circuited to the ground terminal GND, wherein the first reference value REF1 is greater than the second reference value REF2.

In an embodiment of the present invention, the current detecting circuit 1211 can be implemented by using an existing current detector, but is not limited thereto.

In an embodiment of the present invention, the impedance detecting circuit 1212 can be implemented by using an existing impedance detector, but is not limited thereto.

FIG. 2B is a block diagram of an abnormality detecting circuit 121 in FIG. 1 according to another embodiment of the present invention. Referring to FIG. 1 and FIG. 2B, the abnormality detecting circuit 121' can include a voltage detecting circuit 1213 and an impedance detecting circuit 1212. The voltage detecting circuit 1213 is coupled to the first end T11 of the LED string L1 and the switching circuit SW1, and is configured to detect the voltage V1 of the first end T11 of the LED string L1 to obtain a detection voltage value VV1. When the detection voltage value VV1 is equal to zero, the voltage detecting circuit 1213 can generate the control signal CS1 to turn off the switching circuit SW1 and generate the indication signal S11.

The impedance detecting circuit 1212 is coupled to the voltage detecting circuit 1213 to receive the indication signal S11, and detects the impedance of the first end T11 of the LED string L1 in response to the indication signal S11 to obtain the detection impedance value RS1. The operation and implementation of the impedance detecting circuit 1212 in FIG. 2B are similar to those of the impedance detecting circuit 1212 in FIG. 2A, therefore, the related descriptions of FIG. 2A can be referred to, and details are not described herein again.

Figure 3:
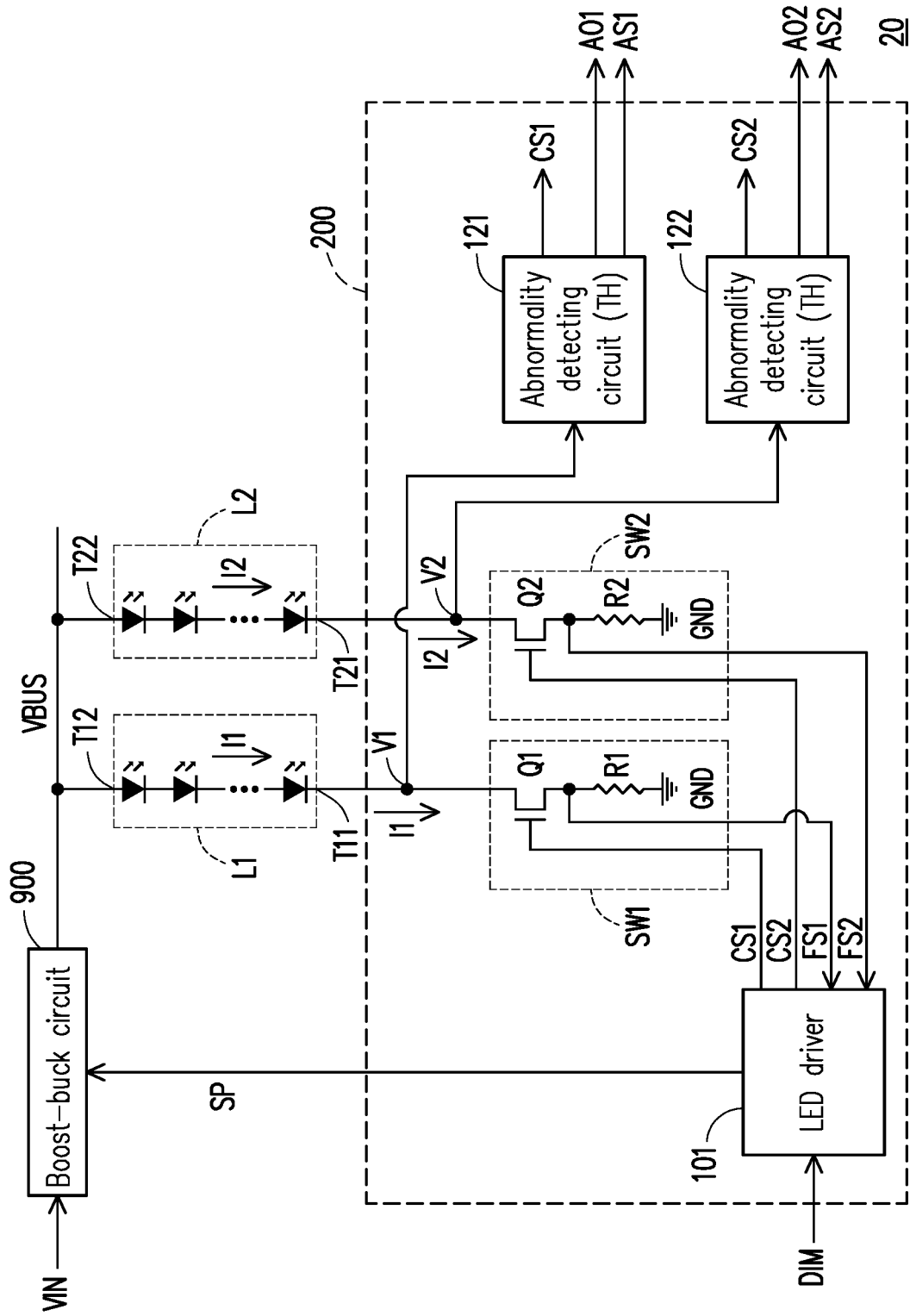
FIG. 3 is a schematic diagram of an LED backlight system according to another embodiment of the present invention.

FIG. 3 is a schematic diagram of an LED backlight system according to another embodiment of the present invention. Referring to FIG. 3, the LED backlight system 20 can include a boost-buck circuit 900, two LED strings L1 and L2, and an LED control circuit 200.

The LED strings L1 and L2 can be operated at the system voltage VBUS generated by the boost-buck circuit 900. More specifically, the boost-buck circuit 900 is coupled to the second ends T12 and T22 (anode ends) of the LED strings L1 and L2. The boost-buck circuit 900 is configured to receive the DC input voltage VIN, and perform boost-buck process on the received DC input voltage VIN by using a pulse width modulation control mechanism to generate and output the system voltage VBUS. It is worth mentioning that in order to make the system voltage VBUS generated by the boost-buck circuit 900 more stable, the LED driver 101 can provide a control signal SP to control or stabilize the output of the boost-buck circuit 900. In other words, the boost-buck circuit 900 can further control or stabilize the system voltage VBUS in response to the control signal SP from the LED driver 101. In an embodiment of the present invention, the boost-buck circuit 900 can be implemented by using an existing boost circuit, buck circuit or boost-buck circuit.

Furthermore, the operation and implementation of the LED strings L1 and L2 and the LED control circuit 200 in FIG. 3 are respectively similar to those of the LED strings L1 and L2 and the LED control circuit 100 in FIG. 1, therefore, the related descriptions of FIG. 1 to FIG. 2B can be referred to, and details are not described herein again.

As mentioned above, in the embodiment of the present invention, when an abnormality of the LED string L1 (L2) is detected, the switching circuit SW1 (SW2) is turned off, the impedance of the first end T11 (T21) of the LED string L1 (L2) is detected, and the abnormality type of the LED string L1 (L2) is determined according to the detected impedance. In other words, the embodiment of the present invention does not determine the abnormality type of the LED string L1 (L2) according to the load change of the boost-buck circuit 900, and then, during the detection of the abnormality, it is not necessary to control the boost-buck circuit 900 to raise the system voltage VBUS, therefore, it is possible to prevent the cross-voltage between two ends of the LED string L1 (L2) from becoming large and accidentally triggering other protection mechanisms. Furthermore, during the detection of the abnormality, the LED control circuit 200 does not need to detect the system voltage VBUS and the internal current of the boost-buck circuit 900, therefore, the hardware cost of the LED control circuit 200 can be reduced, the complexity of abnormality detection can be simplified, and the accuracy of abnormality determination can be improved. Furthermore, the abnormality detection proposed by the embodiment of the present invention is independent of the frequency and duty cycle of the dimming signal DIM, therefore, the LED control circuit 200 can be applied to the LED backlight system using the dimming signal DIM of any frequency.

Figure 4:
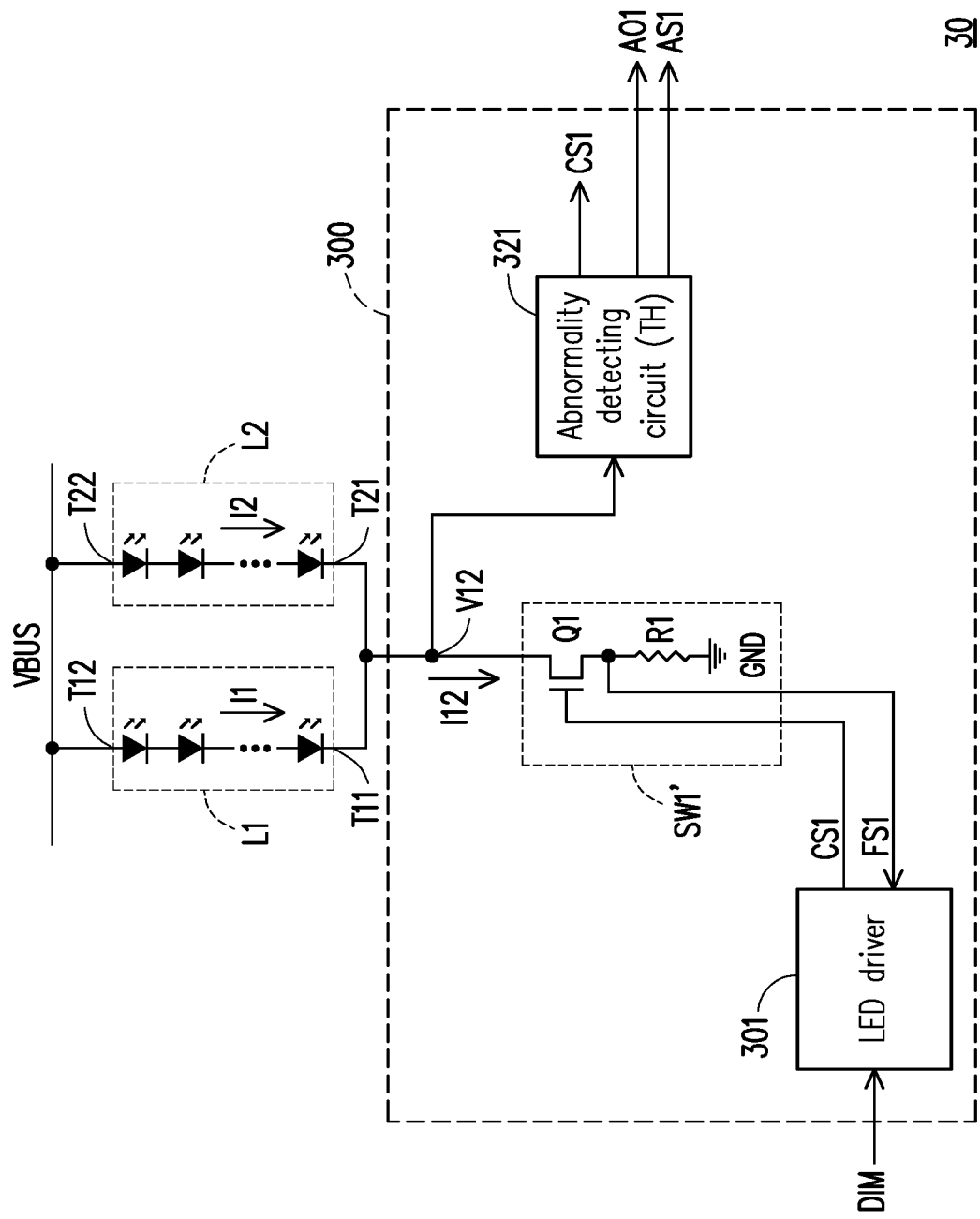
FIG. 4 is a schematic diagram of an LED backlight system according to another embodiment of the present invention.

FIG. 4 is a schematic diagram of an LED backlight system according to another embodiment of the present invention. Referring to FIG. 1 and FIG. 4, the LED backlight system 30 in FIG. 4 can include two LED strings L1 and L2 and an LED control circuit 300. Compared with the LED control circuit 100 in FIG. 1 including an LED driver 101, two switching circuits SW1 and SW2, and two abnormality detecting circuits 121 and 122, the LED control circuit 300 in FIG. 4 includes an LED driver 301, one switching circuit SW1', and one abnormality detecting circuit 321.

In detail, the LED driver 301 is configured to generate one control signal CS1 according to the dimming signal DIM. The switching circuit SW1' is coupled to the first end T11 of the LED string L1 and the first end T21 of the LED string L2. The switching circuit SW1' is coupled to the LED driver 301 to receive the control signal CS1. The switching circuit SW1' can control the current I12 flowing through the LED strings L1 and L2 in response to the control signal CS1.

The abnormality detecting circuit 321 is coupled to the switching circuit SW1', the first end T11 of the LED string L1, and the first end T21 of the LED string L2, and is configured to detect the voltage V12 or the current I12 of the first end T11 of the LED string L1 and the first end T21 of the LED string L2. When the voltage V12 or the current I12 is less than or equal to the threshold value TH, indicating that at least one of the LED strings L1 and L2 is abnormal, so that the abnormality detecting circuit 321 can turn off the switching circuit SW1', and the abnormality detecting circuit 321 detects the impedance of the first end T11 of the LED string L1 and the first end T21 of the LED string L2 when the switching circuit SW1' is off to determine the abnormal states of the LED strings L1 and L2, wherein the abnormal states of the LED strings L1 and L2 may be that the LED strings L1 and L2 are open-circuited or the LED strings L1 and L2 are short-circuited to the ground terminal GND.

It can be understood that the LED control circuit 300 in FIG. 4 uses one switching circuit SW1' and one abnormality detecting circuit 321 to control and detect two LED strings L1 and L2 so as to reduce the hardware cost of the LED control circuit 300. Furthermore, the operation details and implementation of the LED strings L1 and L2, the switching circuit SW1', the abnormality detecting circuit 321, and the LED driver 301 in FIG. 4 are respectively similar to those of the LED strings L1 and L2, the switching circuit SW1, the abnormality detecting circuit 121, and the LED driver 101 in FIG. 1, therefore, the related descriptions of FIG. 1 to FIG. 2B can be referred to, and details are not described herein again.

Similarly, in another embodiment of the present invention, in order to reduce the hardware cost, one switching circuit and one abnormality detecting circuit can also be used for controlling and detecting the two LED strings L1 and L2 in FIG. 3.

Although the present invention has been disclosed above by way of embodiments, it is not intended to limit the present invention. Any person having ordinary knowledge in the art can make some changes and modifications without departing from the spirit and scope of the present invention. Therefore, the protection scope of the present invention is defined by the scope of the appended claims.

What is claimed is:

1. A light emitting diode (LED) control circuit, configured to control a brightness of M LED strings, wherein the M LED strings are connected in parallel, M is a positive integer, and the LED control circuit comprises:
   an LED driver, configured to generate N control signals, wherein N is a positive integer;
   N switching circuits, wherein each of the N switching circuits is coupled to a first end of at least one of the M LED strings, and each of the N switching circuits is coupled to the LED driver to receive one of the N control signals, wherein when each of the switching circuit is conducted according to one of the N control signals, a current is provided to the at least one LED string; and
   N abnormality detecting circuits, wherein each of the N abnormality detecting circuits is coupled to one corresponding switching circuit among the N switching circuits and the first end of at least one corresponding LED string among the M LED strings, and each of the N abnormality detecting circuits is configured to detect a voltage or a current of the first end of the at least one corresponding LED string,
   wherein when the voltage or the current of the first end of the at least one corresponding LED string is less than or equal to a threshold value, the abnormality detecting circuit determines the at least one corresponding LED string to be abnormal and turns off the corresponding switching circuit, and the abnormality detecting circuit detects an impedance of the first end of the at least one corresponding LED string to determine an abnormal state of the at least one corresponding LED string,
   wherein each of the abnormality detecting circuits comprises:
      an impedance detecting circuit, configured to detect the impedance of the first end of the at least one corresponding LED string in response to the determination of the at least one corresponding LED string to be abnormal,
   wherein if the detection impedance value is greater than a first reference value, the impedance detecting circuit determines that the at least one corresponding LED string is open-circuited, and if the detection impedance value is less than a second reference value, the impedance detecting circuit determines that the at least one corresponding LED string is short-circuited to a ground terminal, wherein the first reference value is greater than the second reference value.

2. The LED control circuit according to claim 1, wherein if the impedance of the first end of the at least one corresponding LED string is high impedance, the abnormality detecting circuit determines that the at least one corresponding LED string is open-circuited.

3. The LED control circuit according to claim 1, wherein if the impedance of the first end of the at least one corresponding LED string is low impedance, the abnormality detecting circuit determines that the at least one corresponding LED string is short-circuited to a ground terminal.

4. The LED control circuit according to claim 1, wherein the abnormality detecting circuit comprises:
a current detecting circuit, coupled to the first end of the at least one corresponding LED string and the corresponding switching circuit, and configured to detect the current of the first end of the at least one corresponding LED string to obtain a detection current value, wherein when the detection current value is equal to zero, the current detecting circuit turns off the corresponding switching circuit and generates an indication signal to the impedance detecting circuit to provide the determination that the at least one corresponding LED string to be abnormal.

5. The LED control circuit according to claim 1, wherein the abnormality detecting circuit comprises:
a voltage detecting circuit, coupled to the first end of the at least one corresponding LED string and the corresponding switching circuit, and configured to detect the voltage of the first end of the at least one corresponding LED string to obtain a detection voltage value, wherein when the detection voltage value is equal to zero, the voltage detecting circuit turns off the corresponding switching circuit and generates an indication signal to the impedance detecting circuit to provide the determination that the at least one corresponding LED string to be abnormal.

6. An LED backlight system, comprising:
M LED strings, wherein the M LED strings are connected in parallel, M is a positive integer; and
an LED control circuit, coupled to the M LED strings and comprising:
an LED driver, configured to generate N control signals, wherein N is a positive integer;
N switching circuits, wherein each of the N switching circuits is coupled to a first end of at least one of the M LED strings, and each of the N switching circuits is coupled to the LED driver to receive one of the N control signals, wherein when each of the switching circuit is conducted according to one of the N control signals, a current is provided to the at least one LED string; and
N abnormality detecting circuits, wherein each of the N abnormality detecting circuits is coupled to one corresponding switching circuit among the N switching circuits and the first end of at least one corresponding LED string among the M LED strings, and each of the N abnormality detecting circuits is configured to detect a voltage or a current of the first end of the at least one corresponding LED string,
wherein when the voltage or the current of the first end of the at least one corresponding LED string is less than or equal to a threshold value, the abnormality detecting circuit determines the at least one corresponding LED string to be abnormal and turns off the corresponding switching circuit, and the abnormality detecting circuit detects an impedance of the first end of the at least one corresponding LED string to determine an abnormal state of the at least one corresponding LED string,
wherein each of the abnormality detecting circuits comprises:
an impedance detecting circuit, configured to detect the impedance of the first end of the at least one corresponding LED string in response to the determination of the at least one corresponding LED string to be abnormal,
wherein if the detection impedance value is greater than a first reference value, the impedance detecting circuit determines that the at least one corresponding LED string is open-circuited, and if the detection impedance value is less than a second reference value, the impedance detecting circuit determines that the at least one corresponding LED string is short-circuited to a ground terminal, wherein the first reference value is greater than the second reference value.

7. The LED backlight system according to claim 6, wherein if the impedance of the first end of the at least one corresponding LED string is high impedance, the abnormality detecting circuit determines that the at least one corresponding LED string is open-circuited.

8. The LED backlight system according to claim 6, wherein if the impedance of the first end of the at least one corresponding LED string is low impedance, the abnormality detecting circuit determines that the at least one corresponding LED string is short-circuited to a ground terminal.

9. The LED backlight system according to claim 6, wherein the abnormality detecting circuit comprises:
a current detection circuit, coupled to the first end of the at least one corresponding LED string and the corresponding switching circuit, and configured to detect the current of the first end of the at least one corresponding LED string to obtain a detection current value, wherein when the detection current value is equal to zero, the current detecting circuit turns off the corresponding switching circuit and generates an indication signal to the impedance detecting circuit to provide the determination that the at least one corresponding LED string to be abnormal.

10. The LED backlight system according to claim 6, wherein the abnormality detecting circuit comprises:
a voltage detecting circuit, coupled to the first end of the at least one corresponding LED string and the corresponding switching circuit, and configured to detect the voltage of the first end of the at least one corresponding LED string to obtain a detection voltage value, wherein when the detection voltage value is equal to zero, the voltage detecting circuit turns off the corresponding switching circuit and generates an indication signal to the impedance detecting circuit to provide the determination that the at least one corresponding LED string to be abnormal.

* * * * *